United States Patent
Bulatov et al.

(10) Patent No.: US 12,387,532 B1
(45) Date of Patent: Aug. 12, 2025

(54) METHODS AND SYSTEMS FOR ONSITE SIGNATURE VERIFICATION

(71) Applicant: Parascript LLC, Longmont, CO (US)

(72) Inventors: Ivan Bulatov, Longmont, CO (US); Tatiana Vazioulina, Boulder, CO (US)

(73) Assignee: PARASCRIPT LLC, Longmont, CO (US)

( * ) Notice: Subject to any disclaimer, the term of this patent is extended or adjusted under 35 U.S.C. 154(b) by 0 days.

(21) Appl. No.: 18/797,192

(22) Filed: Aug. 7, 2024

(51) Int. Cl.
  *G06V 40/30* (2022.01)
  *G06F 21/32* (2013.01)

(52) U.S. Cl.
  CPC .............. *G06V 40/33* (2022.01); *G06F 21/32* (2013.01)

(58) Field of Classification Search
  CPC ................................ G06V 40/33; G06F 21/32
  See application file for complete search history.

(56) References Cited

U.S. PATENT DOCUMENTS

| | | | | |
|---|---|---|---|---|
| 6,011,873 A * | 1/2000 | Desai | .................. | G06V 40/388 382/245 |
| 10,810,290 B2 * | 10/2020 | Minter | .................... | G06F 21/64 |
| 11,531,740 B1 * | 12/2022 | Ramanathan | ....... | G06F 21/6209 |
| 2002/0148892 A1 * | 10/2002 | Bardwell | ................ | G06F 21/32 235/380 |
| 2003/0233557 A1 * | 12/2003 | Zimmerman | .......... | G06V 40/30 713/170 |
| 2005/0132195 A1 * | 6/2005 | Dietl | ..................... | H04L 9/3231 713/176 |
| 2018/0247040 A1 * | 8/2018 | Thiebot | ................... | G06F 21/32 |
| 2018/0288040 A1 * | 10/2018 | Kursun | ............... | H04L 63/0861 |
| 2020/0073581 A1 * | 3/2020 | Croxford | ............. | G06F 3/0673 |
| 2020/0117835 A1 * | 4/2020 | Olschowy | ............... | G06F 21/64 |
| 2023/0325618 A1 * | 10/2023 | Yang | .................... | G06K 7/1413 235/462.1 |

OTHER PUBLICATIONS

Querini et al. Handwritten Signature Verification with 2D color Barcodes, IEEE (Year: 2014).*

* cited by examiner

*Primary Examiner* — John B Strege
(74) *Attorney, Agent, or Firm* — Merchant & Gould P.C.

(57) ABSTRACT

A method and system for writable document forgery detection that includes encrypting a reference writing sample, compressing the reference writing sample, embedding the reference writing sample onto the writable document, receiving the writable document, the writable document including a handwritten segment, encrypting the handwritten segment of the received writable document, comparing the encrypted reference writing sample to the encrypted handwritten segment, and assessing a likelihood of the encrypted reference writing sample and the encrypted handwritten segment being written by a same person based on the comparison.

26 Claims, 6 Drawing Sheets

METHODS AND SYSTEMS FOR ONSITE SIGNATURE VERIFICATION

BACKGROUND

Signature or handwriting sample verification is a technique used by various entities such as, e.g., banks, to verify and validate the identity of an individual. Signature or handwriting sample verification may be used to compare signatures or handwriting samples with signatures or handwriting samples previously captured. An image of a signature or handwriting sample, or an actual signature or handwriting sample may be visually inspected or may be submitted to a verification software to be compared to the previously captured image stored on file. Signature or handwriting sample verification software is a type of software that compares signatures or handwriting samples and determines whether the signature or handwriting sample is authentic.

SUMMARY

In one aspect, the technology relates to a method for writable document forgery detection that includes encrypting a reference writing sample, compressing the encrypted reference writing sample, embedding the compressed encrypted reference writing sample onto the writable document, receiving the writable document, the writable document including a handwritten segment, encrypting the handwritten segment of the received writable document, comparing the encrypted reference writing sample to the encrypted handwritten segment, and assessing a likelihood of the encrypted reference writing sample and the encrypted handwritten segment being written by a same person based on the comparison.

In an example, encrypting the reference writing sample includes encrypting one of an image of the reference writing sample and a biometric characteristic of the reference writing sample. In another example, encrypting the reference writing sample includes encrypting one of an image of a signature and a biometric characteristic of the signature. In a further example, at least one of the encrypting, the compressing and the comparing includes using a neural network. In examples, embedding the compressed encrypted reference writing sample onto the writable document includes generating on the writable document at least one of a readable tag that may be machine readable or readable by a human operator, a printed label, a printed bar code, a printed quick response code, a magnetic strip, and a radio frequency identification tag. In other examples, receiving the writable document includes receiving the writable document at one of an automated teller machine and a receiving institution. The receiving institution may be a financial institution. In further examples, receiving the writable document includes scanning at least the handwritten segment of the received writable document.

In additional examples, the writable document includes one of a check and a legal instrument such as a contract, a will, or other agreement. In yet another example, encrypting the handwritten segment included in the writable document includes encrypting one of an image of the handwritten segment and a biometric characteristic of the handwritten segment. In a further example, assessing the likelihood includes generating a similarity factor between the encrypted reference writing sample and the encrypted handwritten segment. In further examples, the method further includes establishing a similarity factor threshold, wherein when the generated similarity factor is equal to or greater than the established similarity factor threshold, the encrypted reference writing sample and the encrypted handwritten segment are considered to be written by the same person.

In another aspect, the technology relates to a writable document forgery detection system that includes an updatable data repository, an embedding device, and a computing device operatively coupled to the updatable data repository and to the embedding device, the computing device including a processor and a memory, the memory storing instructions that, when executed by the processor, perform a set of operations including encrypting, via the processor, a reference writing sample, compressing, via the processor, the encrypted reference writing sample, and embedding, via the embedding device, the compressed encrypted reference writing sample onto the writable document.

In an example, the processor includes a neural network. In another example, the set of instructions includes encrypting the reference writing sample by encrypting one of an image of the reference writing sample and a biometric characteristic of the reference writing sample. In a further example, wherein the set of instructions includes encrypting the reference writing sample by encrypting one of an image of a signature and a biometric characteristic of the signature. In other examples, the set of operations includes embedding the compressed encrypted reference writing sample onto the writable document by generating at least one of a readable tag, a printed label, a printed bar code, a printed quick response code, and a radio frequency identification tag on the writable document.

In a further aspect, the technology relates to a writable document forgery detection system that includes a receiving device, an updatable data repository functionally coupled to the receiving device, and a computing device operatively coupled to the receiving device and to the updatable data repository, the computing device including a memory, the memory storing instructions that, when executed by the processor, perform a set of operations including receiving the writable document at the receiving device, the writable document including a handwritten segment and a compressed encrypted reference writing sample embedded thereon, encrypting, via the processor, the handwritten segment of the writable document, comparing, via the processor, the encrypted reference writing sample to the encrypted handwritten segment, and assessing, via the processor, a likelihood of the encrypted reference writing sample and the encrypted handwritten segment being written by a same person based on the comparison.

In an example, the processor includes a neural network. In another example, the writable document includes one of a check and a legal instrument. In a further example, the receiving device includes one of an automated teller machine and a reading machine at a receiving institution. In a further example, the set of operations includes receiving the writable document at the receiving device by scanning at least the handwritten segment of the received writable document at the receiving device. In yet another example, the set of operations includes encrypting the handwritten segment included in the writable document by encrypting one of an image of the handwritten segment and a biometric characteristic of the handwritten segment. In other examples, the set of operations includes assessing the likelihood by generating a similarity factor between the encrypted reference writing sample and the encrypted handwritten segment. In further examples, the set of operations further includes establishing a similarity factor threshold, wherein when the generated similarity factor is equal to or greater than the established similarity factor threshold, the encrypted reference writing sample and the encrypted handwritten segment are considered to be written by the same person.

In an additional aspect, the technology relates to a writable document forgery detection system that includes a receiving device, an embedding device, at least one updatable data repository functionally coupled to the receiving device and to the embedding device, at least one computing device operatively coupled to the receiving device and to the at least one updatable data repository, the at least one computing device including at least one processor and at least one memory, the memory storing instructions that, when executed by the at least one processor, perform a set of operations including encrypting, via the at least one processor, a reference writing sample, compressing, via the at least one processor, the encrypted reference writing sample, embedding, via the embedding device, the compressed encrypted reference writing sample onto the writable document, receiving the writable document at the receiving device, the writable document including a handwritten segment, encrypting, via the at least one processor, the handwritten segment of the writable document, comparing, via the at least one processor, the encrypted reference writing sample to the encrypted handwritten segment, and assessing, via the at least one processor, a likelihood of the encrypted reference writing sample and the encrypted handwritten segment being written by a same person based on the comparison.

In an example, at least one of the reference writing sample and the handwritten segment includes a signature. In another example, the processor includes a neural network. In a further example, the set of instructions include encrypting the reference writing sample by encrypting one of an image of a signature and a biometric characteristic of the signature. In a further example, the set of instructions include encrypting the reference writing sample by encrypting one of an image of the reference writing sample and a biometric characteristic of the reference writing sample. In yet another example, the set of operations includes encrypting the handwritten segment of the writable document by encrypting one of an image of the handwritten segment and a biometric characteristic of the handwritten segment.

The details of one or more techniques are set forth in the accompanying drawings and the description below. Other features, objects, and advantages of these techniques is apparent from the description, drawings, and claims.

DETAILED DESCRIPTION

Figure 1:
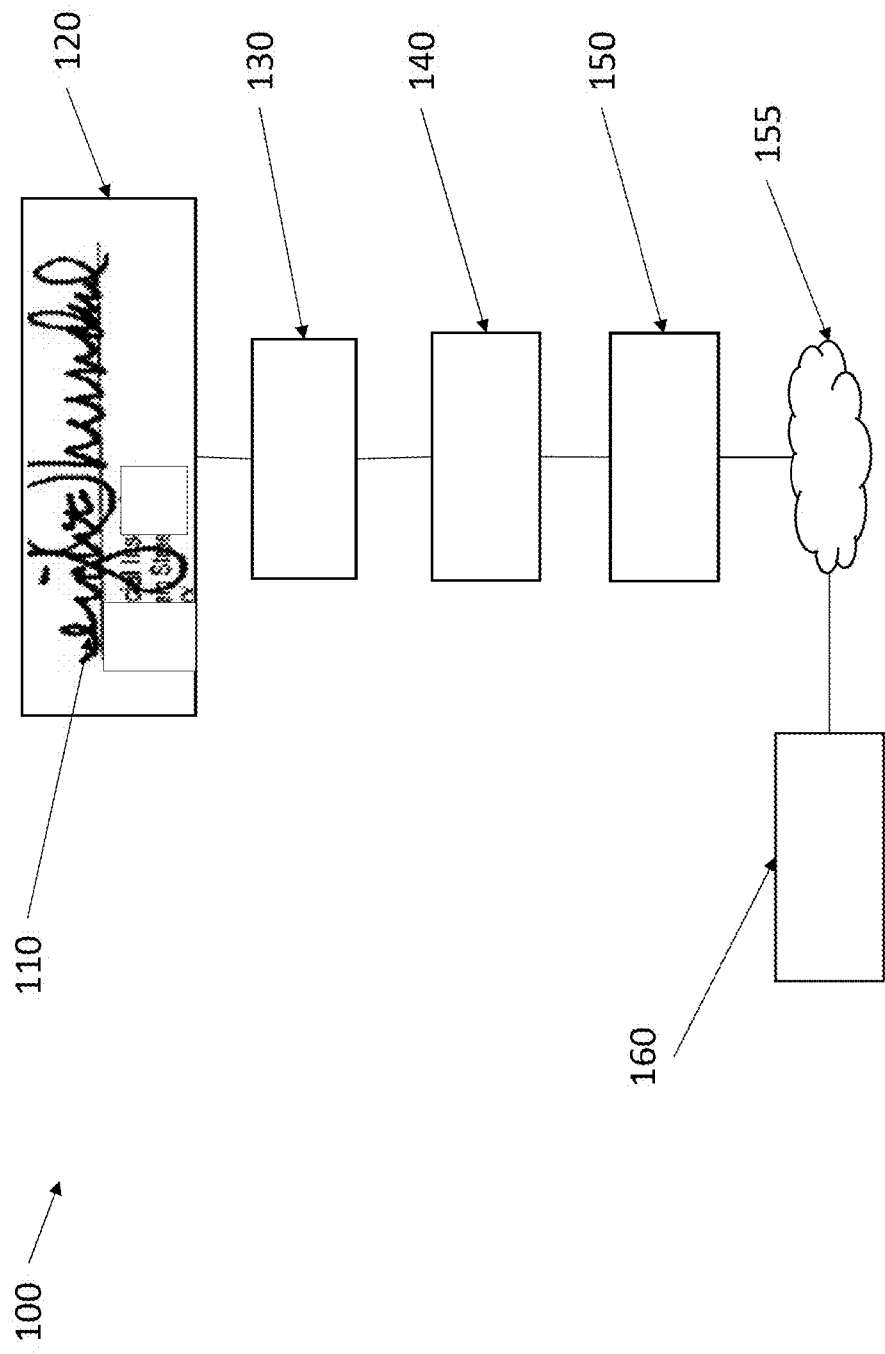
FIG. 1 is a diagram illustrating a system for writable document forgery detection, in accordance with various aspects of the disclosure.

Visually determining whether a signature or a handwriting sample is authentic poses a number of challenges, particularly when the determination of the authenticity of the signature or handwriting sample is to be performed in real time. A challenge includes the fact that authentic signatures or handwriting samples made by the same person may have some degree of variability, e.g., over time or based on a given health condition. Another challenge includes the fact that the degree of variability between authentic signatures or handwriting sample may vary from person to person. Yet another challenge includes the fact that forgers imitate signatures or handwriting samples to attempt to obtain money, goods and/or services, and in the case of good forgeries, it may be difficult with the naked eye to determine whether a signature or a handwriting sample is authentic or a forgery. Thus, the ability to improve the accuracy of a verification process in real time may be advantageous. Accordingly, there is an advantage in reliably and accurately verifying a signature or a handwriting sample to determine whether the signature or the handwriting sample provided is authentic, or whether the signature or the handwriting sample provided is a forgery. Another advantage may be to reliably and accurately verify the signature or the handwriting sample in real time, e.g., at the time a person presents a document such as, e.g., a check, to a financial institution. Accordingly, there is a technical problem that arises out of the fact that signature or handwriting sample verification, e.g., in real time, is time consuming and inefficient.

Signature and handwriting verification technologies have become significant tools for ensuring the integrity and security of financial transactions and legal documents. Typically, historical archived data is used as a reference point for comparison. For example, an archived signature or handwriting sample may be used as a reference to compare the signature or handwriting sample on, e.g., a check, a contract, a will, a handwritten message, and the like. However, a significant challenge arises in scenarios such as automated teller machines (ATM) and check processing, where detecting check washing is impeded by the absence of authentic archived sample signatures for signature verification, or archived genuine handwriting samples for check washing detection. The absence of these authentic samples hampers the effectiveness of traditional signature and handwriting sample verification techniques, leaving institutions such as, e.g., financial institutions or other entities requiring the verification of handwriting, vulnerable to fraudulent activities. Therefore, there is an advantage in, e.g., a need for, a solution that can provide authentic samples of signatures or handwriting samples directly at the point of verification such as, e.g., at the ATM, a notary public, or a bank branch. In particular, encoding authentic signatures of account holders on the writable documents themselves such as, e.g., a check, contract, or will, to compare the encoded authentic signatures with the handwriting on the same writable document, e.g., check, may provide an advantageous method of detecting signature forgery or check washing forgery, or other types of forgery.

A solution to the above challenges may include receiving a written signature or a handwriting sample from a person, extracting at least one of an image of the written signature or handwriting sample and a trajectory of the written signature or handwriting sample from the received written signature or handwriting sample, accessing a reference signature or reference handwriting sample, extracting at least one of a reference image and a reference trajectory from the accessed reference signature or reference handwriting sample, comparing the image of the written signature or handwriting sample and/or the trajectory of the written signature or of the handwriting sample to the reference image and/or reference trajectory, and determining whether the written signature or the handwriting sample is authentic based on the comparison.

Examples of the current disclosure include a method for encoding an authentic signature and/or a handwriting sample directly on a writable document, e.g., directly on a check or contract, with the possibility of automatically extracting and decoding the authentic signature and/or handwriting sample from an image of the writable document, e.g., check or contract, during the verification process. Accordingly, the encoded authentic signature and/or handwriting sample may be used as a reliable reference point for a signature and handwriting verification algorithm, thus enhancing the accuracy and reliability of the verification algorithm in detecting fraudulent behavior such as, e.g., check washing. By incorporating authentic a signature and/or a handwriting sample into the verification process, examples of this disclosure significantly mitigate the risk of fraudulent activity, thus safeguarding the integrity of financial transactions and legal documents.

Another solution includes relying on neural networks, which are collections of weighted functions where the output of one weighted function or layer is the input in another weighted function or layer. In the case of a Siamese neural network, the neural subnetworks of the Siamese neural network have shared weights. The neural networks may be trained on known data sets of signatures or handwriting samples, and trained neural networks may then be used on unknown data sets of signatures or handwriting samples. For example, the neural networks may be trained on a number of known signatures or handwriting samples, as well as on a number of known forgeries, so that when an unknown signature or handwriting sample is presented, it may be possible to determine with a degree of confidence whether the unknown signature or handwriting sample is in fact authentic or a forgery.

Encoding an Image of a Signature or Biometric Characteristics of a Signature (Trajectory) on Writable Documents Such as Bank Checks for Further Signature Verification Examples of the disclosure include using authentic samples of the signature of, e.g., an account holder, that is encoded or embedded on a writable document or media such as, e.g., a bank check, as a source of reference data for further signature verification. In the case of financial institutions such as banks, bank checks are subject to signature fraud, which may be detected if a signature on a check can be compared in real time against an authentic signature belonging to the account holder. In most current bank settings, images of reference cards, or signatures on historical archived checks, which were proven to be authentic, are used as a reference. However, many transactions such as, e.g., ATM transactions or transactions in a bank branch that does not have access to an archived authentic reference signature, do not have access to historical data, thus making signature verification challenging. Example embodiments of this disclosure include a method of encoding signatures of an account holder directly on the check, which allows the immediate access to the reference signature that is encoded or embedded on the check to be compared to the signature written on the same check, at the point of sale, ATM machine, kiosk, and other locations or settings that may be taken advantage of by issuers of fraudulent checks. Encoding or embedding a signature on a check renders the signature inaccessible and virtually invisible to a potential offender or forger, thus reducing or eliminating the possibility of washing a check and writing thereon a different signature than the intended person to, e.g., cash the check on a different account than the intended person or entity.

Determining the authenticity of a signature on a writable document, e.g., a check, includes having the reference signature on the same writable document or check. The reference signature may be captured from an original reference signature media, the media being, e.g. the writable document, check, or signature pad, or may be provided in the form of a trajectory. Trajectory features may include at least one of a sequence of coordinates representing locations of a writing member, a time stamp corresponding to each location, a pressure applied by the writing member, and a tilt of the writing member. The authentic signature and/or the trajectory reference may be embedded on the writable document in an encoded form, rendering the authentic signature and/or trajectory reference substantially difficult to copy and substantially unusable for illicit purposes.

Various examples of the disclosure include an initial operation of accessing a reference signature or reference writing sample at a media and extracting either a reference image or a reference trajectory from the reference signature or reference writing sample taken at the media. The media may be, e.g., a piece of paper, an input pad, or other system or mode of gathering, receiving or collecting a signature or writing sample. In various instances, the reference signature may have been previously provided by the individual, and may be retained as a reference for authentication of subsequently provided signatures. Accessing the reference signature may include, e.g., retrieving a scan of a reference card completed by the account holder, archived historical checks bearing the account holder's authentic signature, or previously collected biometric signature characteristics belonging to the account holder. The extraction of the reference signature or reference writing sample from the media can be achieved using neural networks.

In various examples, encoding the account holder's authentic reference signature on the writable document includes transforming the reference signature to be, e.g., printed, scanned, embedded, affixed, or otherwise associated to the writable document. Accordingly, the reference signature extracted from the media may undergo transformation by a second neural network trained to generate embedding vectors. The reference signature, in the form of one or more embedding vectors, may be encoded using one of several methods, including but not limited to, e.g., a quick-response (QR) code, a barcode, a stacked linear barcode (PDF417), a radio frequency identification (RFID) tag, among others, and embedded on the front or back side of the writable document, e.g., the check. In an example, when a check belonging to a person is issued to the person, the person's reference signature may be embedded on the check.

The written signature that is presented for verification is typically located on the writable document, e.g., the check or contract, and may be extracted from the writable document to be compared to the reference signature that is encoded or embedded on the same writable document. In examples, extracting the written signature from the writable document may be performed using a neural network. Accordingly, the written signature may be transformed by a neural network that is trained to extract the written signature and to encode the written signature by generating embedding vectors. The neural network that is used for the transformation of the written signature may be the same as the neural network that is used for the transformation of the reference signature. For instance, the neural networks utilized for reference signature embedding and written signature embedding may be Siamese neural networks.

During the verification process, the reference signature embedded on the front or back side of the writable document is extracted and decoded to allow for the comparison thereof with the written signature. For example, both the transformed reference signature and the transformed written signature may then be provided to a third neural network, which may be trained to compare the embedding vectors of both the transformed reference signature and the transformed written signature. In an example, the third neural network may generate a score indicative of the degree of confidence that the reference signature and the written signature belong to the same individual or whether they belong to different individuals.

Encoding an Image of a Sample Handwriting on Bank Checks to Make the Image Available for Detection of Washed Checks Similarly to the above example of comparing signatures, in this example, an authentic handwriting sample that is encoded in a media such as a check, a contract, or other document that requires writing verification, may also be a source of reference data for fraud detection. Currently, check fraud may be detected if a handwriting on a check is compared against one or more samples of authentic handwriting belonging to the account holder. Typically, handwriting preserved on a check in fields other than those that were washed and altered (e.g., payee name, amount) may be used as a reference handwriting. When archived checks that include the person's handwriting, and which are known to be authentic, are available, these archived checks can also be used as sources of reference handwriting. However, when access to historical data is not available, handwriting verification becomes challenging. The method of encoding a handwriting sample of, e.g., an account holder, on a check may enable the immediate access to reference data at a point of sale, an ATM machine, a kiosk, or any other locations or in any other situations that may be prone to the use of fraudulent checks. Encoding or embedding a sample of handwriting of the account holder on a check renders the handwriting sample substantially inaccessible and virtually invisible to potential offenders, reducing or eliminating the possibility of copying or mimicking an authentic handwriting of the account holder for, e.g., criminal purposes.

Determining the authenticity of handwriting on a written document requires the presence of a reference handwriting sample. In examples of the disclosure, the reference handwriting is embedded in an encoded form or encoded on the same document, e.g., the check. The reference handwriting sample may be captured from an original reference handwriting medium such as, e.g., an archived check image or an image of another document, or provided in the form of a reference trajectory. Reference trajectory features may include one or more sequences of coordinates representing locations of a writing member which may be a pen or other writing implement, a time stamp corresponding to each location of the writing member on the document, a pressure applied by the person via the writing member, and a tilt of the writing member. The reference trajectory features may then be embedded on the writable document in an encoded form, rendering the trajectory reference features substantially challenging to copy and substantially unusable for illicit or criminal purposes.

According to various examples, an initial operation may include accessing a reference sample(s) of handwriting, and extracting either a reference image or a reference trajectory of the reference sample(s) from the reference handwriting media. In various instances, the reference handwriting sample may have been previously provided by the individual and retained as a reference for authentication of subsequently provided documents that are filled out with handwriting, or may be captured from archived documents (checks) that proved to be authentic. Accessing the reference handwriting sample file may entail retrieving a scan of a reference document completed by the account holder, archived historical checks bearing the account holder's authentic handwriting, or previously collected biometric characteristics of handwriting belonging to the account holder. The extraction of the reference handwriting from the original media can be achieved using, e.g., neural networks. The original media here refers to the media where the reference handwriting or check has been taken. The original media may be, e.g., a sheet of paper, an input pad, a scan, a photograph, and the like.

In examples, when the reference handwriting is extracted from the original media, the reference handwriting may undergo a transformation by a second neural network that is trained to generate embedding vectors. Accordingly, the reference handwriting, in the form of embedding vectors, may be encoded using one of several methods, including but not limited to a QR code, a barcode, PDF417, or RFID, and embedded on the front or back side of the writing document, e.g., in the front or back of a check or contract.

In other examples, the handwriting or signature to be authenticated, which is typically located on, e.g., the writing document or check, is extracted from the writing document or check. For example, the handwriting or signature may be extracted from the writing document using neural networks.

Subsequently, the handwriting or signature to be authenticated is transformed to generate embedding vectors. For example, the handwriting or signature to be authenticated is transformed by a neural network trained to generate the embedding vectors. The neural network used for the transformation of the handwriting or signature to be authenticated may be the same as the neural network used for the transformation of the reference handwriting. For instance, the neural networks utilized for embedding the reference handwriting and for embedding the handwriting or signature to be authenticated may be or include, e.g., Siamese neural networks. During the verification process, the reference handwriting embedded on the front or back side of the writing document is extracted and decoded. The writing document may be decoded to an embedding format thereof.

When both the reference handwriting or signature and the handwriting or signature to be authenticated are embedded as embedding vectors, both embedding vectors may be provided to a third neural network. In examples, the third neural network may be trained to compare embedding vectors, and to generate a score indicative of the degree of confidence that the reference handwriting or signature and the handwriting or signature to be authenticated belong to the same individual, or to different individuals.

FIG. 1 is a diagram illustrating a method and system for writable document washing or forgery detection, in accordance with various aspects. In FIG. 1, in the system 100, a reference writing sample 110 may be provided at, e.g., a writing receiving device 120, for example by a person (not shown). In various aspects, the reference writing sample 110 may be or include a reference signature or reference handwriting sample 110, and may be entered on the writing receiving device 120 via, e.g., a pen, a stylus, other writing member, a finger of the person, or other method of entering a handwriting sample. In another example, the reference writing sample 110 may be entered as an image such as, e.g., an image of an already existing writing sample. The reference handwriting sample 110 may also be entered in the form of a photograph or a scan. For example, an ID document may be provided in the form of a scan, and from the scan of the ID document, an image of the reference handwriting sample or signature 110 may be extracted. In an example, the writing receiving device 120 may be or include, e.g., a sheet or piece of paper, a signature pad or signature screen or display such as, e.g., a handheld device, smartphone, tablet, or other writing receiving device. The writing receiving device 120 may also be a kiosk including a writing receiving surface, a video camera, a photo camera and/or a scanning device.

In various examples, the reference writing sample or signature 110 may be encrypted via, e.g., an encrypting software or engine 130. For example, the reference writing sample or signature 110 may also be compressed via, e.g., a compression engine or software 140. In various aspects and as further discussed below, the compressed encrypted reference writing sample or signature 110 may be saved in a data repository 150 such as, e.g., a memory. The system 100 may also include an embedding device 160. For example, the embedding device 160 may be or include a printing or encoding device 160 configured to print or encode the reference writing sample or signature 110 onto, e.g., a writable document. The writable document such as, e.g., a check, may correspond to the writable document 200 further discussed below. Although the embedding device 160 is illustrated as being directly connected to the other elements of the system 100, the embedding device 160 may be separate from the other elements of the system 100, and may be used to embed the reference writing sample or signature 110 by accessing the reference writing sample or signature 110 stored in a data repository such as data repository 150 at a same time, or at a different time, from the time when the reference writing sample or signature 110 is stored onto the data repository 150. In addition, the embedding device 160 may be remote from the data repository 150, and may access the data repository via, e.g., a cloud system 155, the internet, an intranet, or other remote access system or device.

Figure 2:
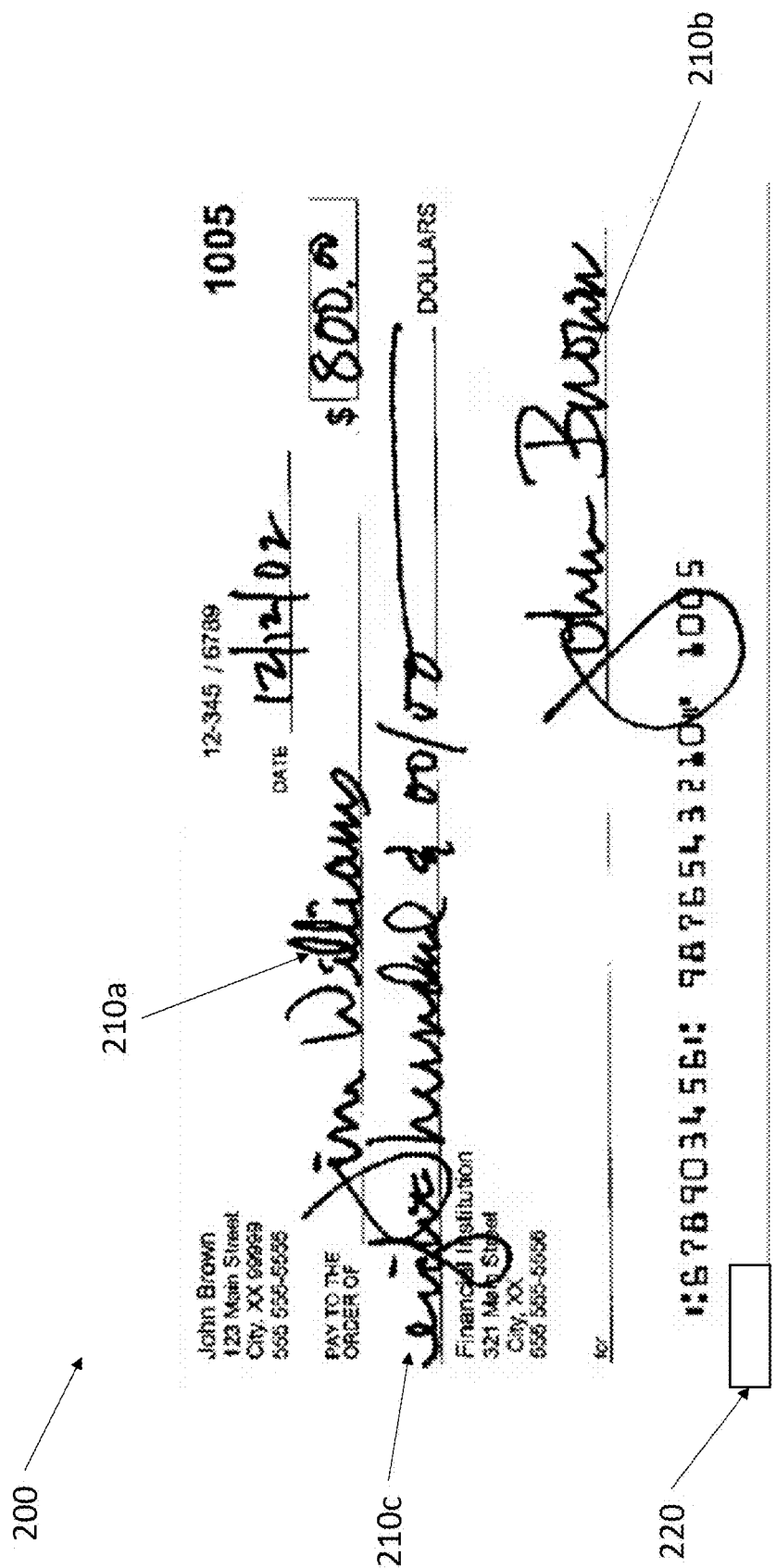
FIG. 2 is an illustration of a writable document with an embedded reference writing sample, in accordance with various aspects of the disclosure.

FIG. 2 is an illustration of a writable document with an embedded writing sample thereon, in accordance with various aspects of the disclosure. In FIG. 2, the writable document 200 includes one or more writing segments 210a-210c. In the example illustrated in FIG. 2, the writable document 200 is a check. However, the writable document 200 may be any other written document or instrument where verifying a writing segment such as, e.g., a signature, is relevant in validating the document. For example, the writable document may be a contract, a will, a promissory note, an agreement, or other legal document that necessitates the validation of a person's signature or handwriting. In various examples, the writable document 200 includes an embedded portion 220.

For example, the embedded portion 220 may be or include a compressed encrypted reference writing sample from the same person who is to write on the writable document 200. For example, the compressed encrypted writing sample embedded in the embedded portion 220 is from the same person who purportedly has signed or written any one or more of the writing segments 210a-210c. In the case of a check 200, then the embedded portion 220 may be or include a compressed encrypted reference writing sample or signature from the same person who is to sign the check 200 at portion 210b. In the example illustrated in FIG. 2, the embedded portion 220 may be or include a compressed encrypted reference writing sample or signature from John Brown. In an example, the embedded portion 220 may be or include at least any one of a printed label, a printed bar code, a printed quick response code, a magnetic strip, and a radio frequency identification tag.

Figure 3:
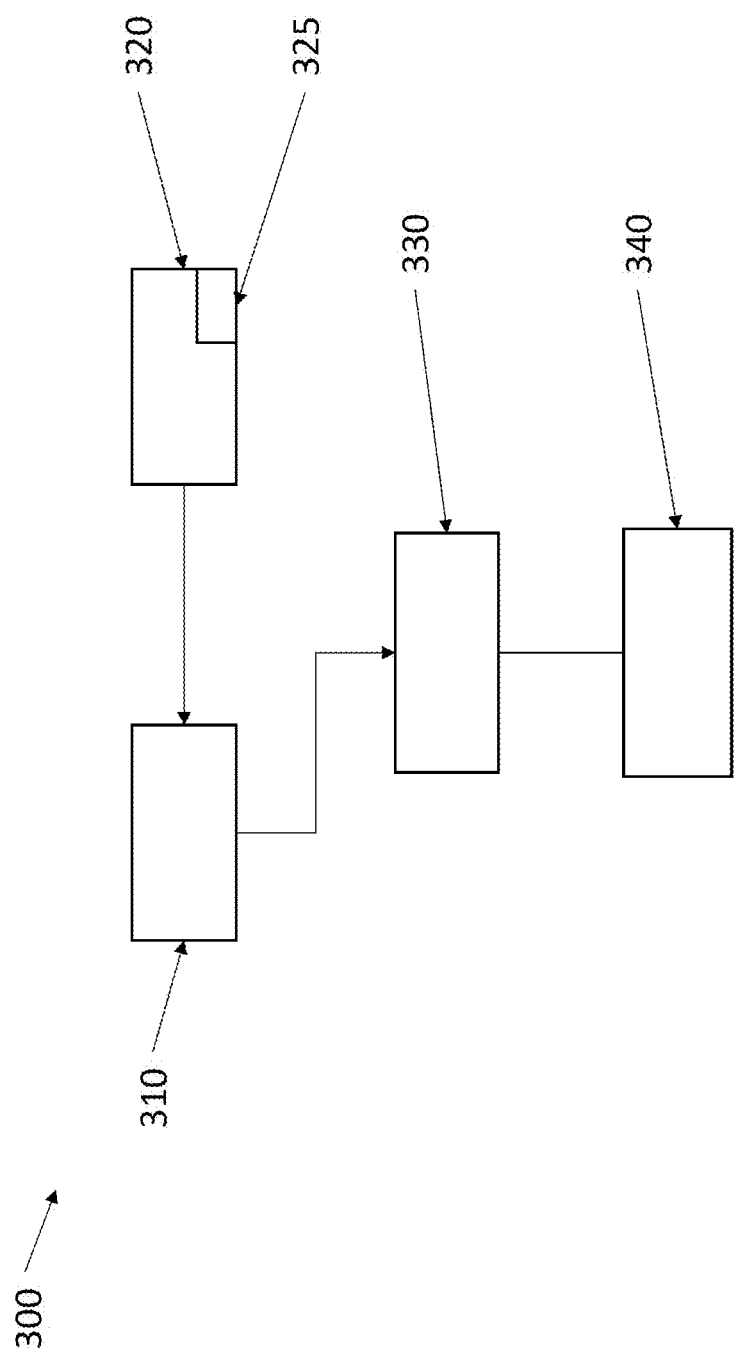
FIG. 3 is a diagram illustrating a system for receiving a reference writing sample or signature to be authenticated, in accordance with various aspects of the disclosure.

FIG. 3 is a diagram illustrating a system for receiving a writing sample or signature to be authenticated, in accordance with various aspects of the disclosure. In FIG. 3, the system 300 includes a receiving device 310. For example, the receiving device 310 may be configured to receive, e.g., writable document 320, which may be similar to the writable document 200 illustrated in FIG. 2 and that includes a handwritten segment or signature, such as the signature 210b also illustrated in FIG. 2. In examples, the writable document 320 may be or include a legal document or instrument such as, e.g., the check 200 illustrated in FIG. 2, a will, a contract, a promissory note, an agreement, or any other document or instrument that relies on the validity of a signature written or affixed thereon to be valid or usable. The receiving device 310 may be coupled to an updatable data repository and to a computing device (not shown) that may be similar to the data repository and computing device described below with reference to FIG. 6.

In various examples, the writable document 320 received at the receiving device 310 may include a handwriting portion or signature 325 to be encrypted via, e.g., an encrypting software or engine 330. For example, the encrypted handwriting portion or signature 325 received at the receiving device 310 as part of the writable document 320 may also be compressed via, e.g., a compression engine or software 340. In various aspects and as further discussed below, the compressed encrypted writable document 320 may be saved in a data repository such as, e.g., a memory (not shown). The receiving device 310 may also be functionally coupled to an updatable data repository and a computing device, not shown in FIG. 3 but described in greater detail in FIG. 6.

Figure 4:
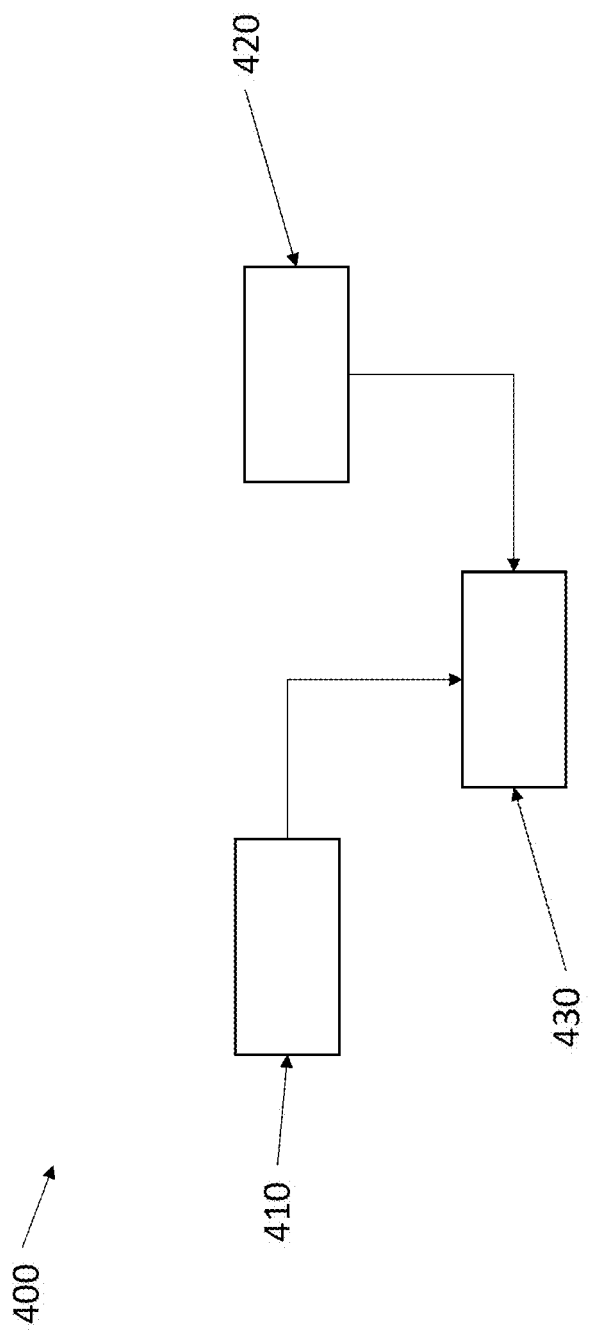
FIG. 4 is a diagram illustrating a system for writable document forgery detection, in accordance with various aspects of the disclosure.

FIG. 4 is a diagram illustrating a system for writable document forgery or washing detection, in accordance with various aspects of the disclosure. In FIG. 4, the system 400 includes an embedded reference writing sample or signature 410 such as, e.g., the reference writing sample or signature 110 illustrated in FIG. 1. For example, the reference writing sample 410 may be encrypted and compressed, and may be embedded on a writable document. With reference to FIG. 2, the embedded encrypted and compressed reference writing sample 410 may correspond to the embedded portion 220 on the writable document 200. The system 400 also includes a handwritten segment 420 that is on, or that is part of, the writable document. For example, the handwritten segment 420 may also be encrypted and compressed before being embedded in the writable document. With reference to FIG. 2, the handwritten segment 420 may correspond to the handwritten segment 210b on the writable document 200.

The system may further include a software engine or processor 430 configured to access and decrypt both the encrypted and compressed writing sample 410 and the encrypted and compressed handwritten segment 420. For example, the software engine may be or include one or more neural networks. In another example, a neural network may be or include a Siamese neural network. In various examples, the software engine 430 may access and decrypt both the writing sample 410 and the handwritten segment 420. The software engine 430 may also compare the decrypted writing sample 410 and handwritten segment 420 and, based on the comparison, determine whether the writing sample 410 and the handwritten segment 420 are written by the same person.

Figure 5:
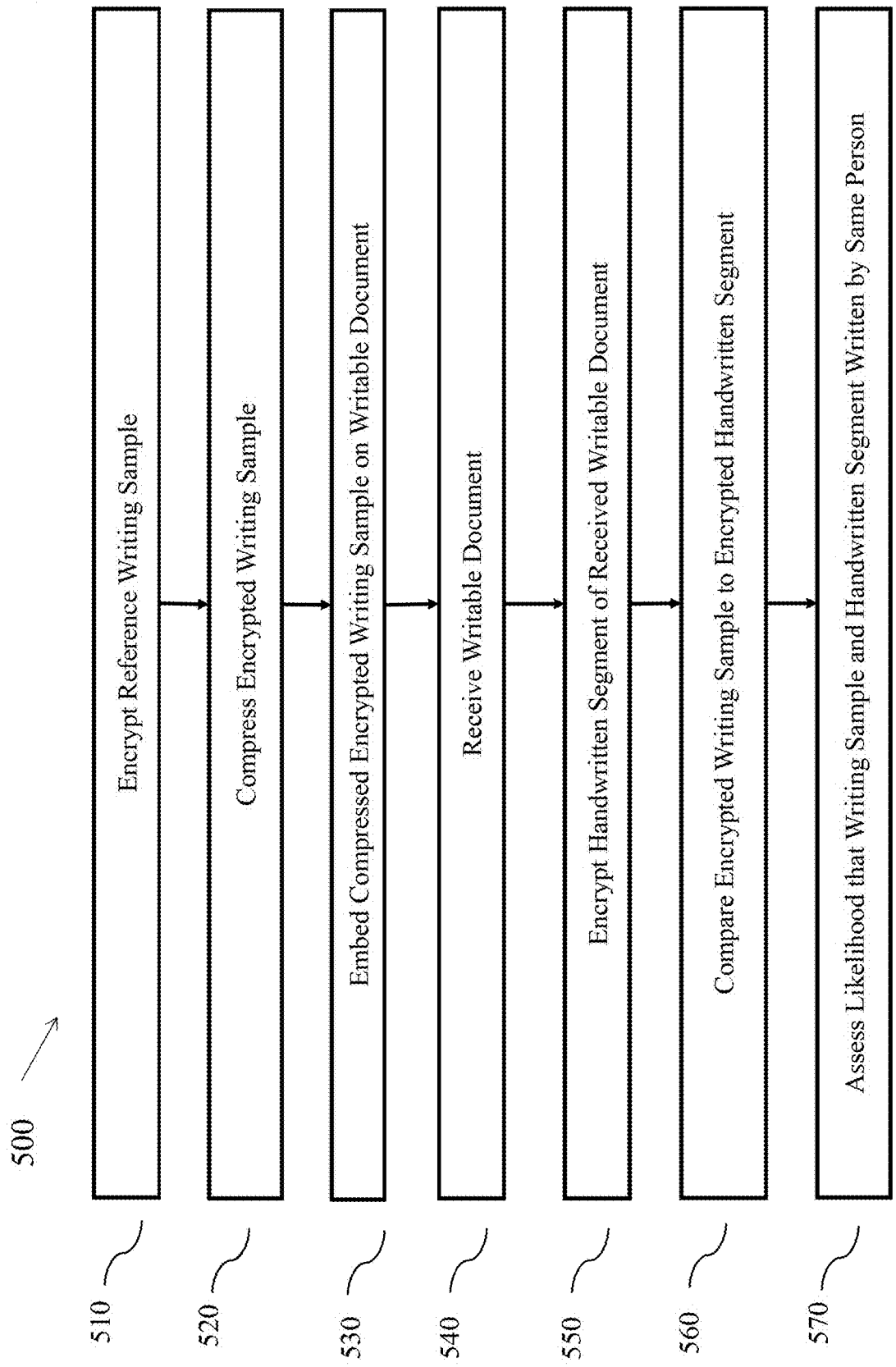
FIG. 5 is a flow chart illustrating a method of writable document forgery detection, in accordance with various aspects of the disclosure.

FIG. 5 is a flowchart describing a method for writable document forgery detection, in accordance with various aspects. For the sole purpose of convenience, method 500 is described through use of at least the example system 600 described below. However, it is appreciated that the method 500 may be performed by any suitable system.

Operation 510 includes encrypting a reference writing sample of, e.g., a person. For example, the person may enter their reference writing sample such as, e.g., a signature, on a receiving device. The receiving device may be a sheet of paper, an electronic pad, or other device configured to receive a person's handwriting or signature. When the reference writing sample is entered, the reference writing sample may be scanned and/or stored in memory in digital form. In various aspects, encrypting the reference writing sample includes encrypting one of an image of the reference writing sample and a biometric characteristic of the reference writing sample. In the case of a signature, encrypting the reference writing sample includes encrypting one of an image of a signature and a biometric characteristic of the signature. For example, encrypting the reference writing sample may be performed via an encrypting software. For example, encrypting the writing sample may be performed via a neural network such as, e.g., a Siamese neural network.

Operation 520 includes compressing the encrypted reference writing sample. For example, compressing the encrypted reference writing sample may be performed by a compression software. For example, compressing the encrypted reference writing sample may be performed via a neural network such as, e.g., a Siamese neural network.

Operation 530 includes embedding the compressed encrypted reference writing sample onto the writable document. In the case of a bank check, operation 530 includes embedding or printing the compressed encrypted reference writing sample on a portion of the check. With reference to FIG. 2, operation 520 includes embedded portion 220 on the check 200. In various aspects, embedding the compressed encrypted reference writing sample onto the writable document may be performed by generating on the writable document at least one of a readable tag, e.g., machine readable or readable by a human, a printed label, a printed bar code, a printed quick response code, a magnetic strip, a radio frequency identification tag, and the like.

Operation 540 includes receiving the writable document, the writable document including a handwritten segment. With reference to FIG. 2, operation 540 includes receiving the writable document or check 200 that includes the handwritten segment of any one of handwritten segments 210a-210c including the signature 210b. For example, when the writable document is a check, then operation 540 includes receiving the check, and the check includes a signature of the person as well as the embedded reference writing sample thereon. In various aspects, receiving the writable document may be performed by scanning at least the handwritten segment, e.g., the signature, of the writable document. As another example, receiving the writable document includes receiving the writable document at one of an automated teller machine and a receiving institution. For example, the receiving institution may be a bank, a car dealership, a law firm, a notary, or other institution that may receive a check or a legal instrument which validity depends on verifying a signature thereon.

Operation 550 includes encrypting the handwritten segment of the received writable document. With reference to FIG. 2, operation 550 includes encrypting any one of handwritten segments 210a-210c including the signature 210b. In an example of operation 550, encrypting the handwritten segment included in the writable document may be performed by encrypting an image of the handwritten segment, e.g., an image of a signature, or a biometric characteristic of the handwritten segment, e.g., a velocity, angle, or other characteristic of the signature.

Operation 560 includes comparing the encrypted reference writing sample to the encrypted handwritten segment. With reference to FIG. 2, operation 560 includes comparing the encrypted embedded portion 220, which includes the reference writing sample or signature, to an encrypted handwritten segment such as any one or more of handwritten segments 210a-210c. For example, comparing the encrypted writing sample to the encrypted handwritten segment may be performed by relying on a software engine such as, e.g., a neural network. An example of neural network includes a Siamese neural network.

Operation 570 includes assessing a likelihood of the encrypted reference writing sample and the encrypted handwritten segment being written by a same person based on the comparison. For example, assessing the likelihood of the encrypted writing sample and the encrypted handwritten segment being written by the same person may include generating a similarity factor between the encrypted writing sample and the encrypted handwritten segment. For example, operation 570 may include establishing a similarity factor threshold, and when the generated similarity factor is equal to or greater than the established similarity factor threshold, the encrypted writing sample and the encrypted handwritten segment are considered to be written by the same person.

Figure 6:
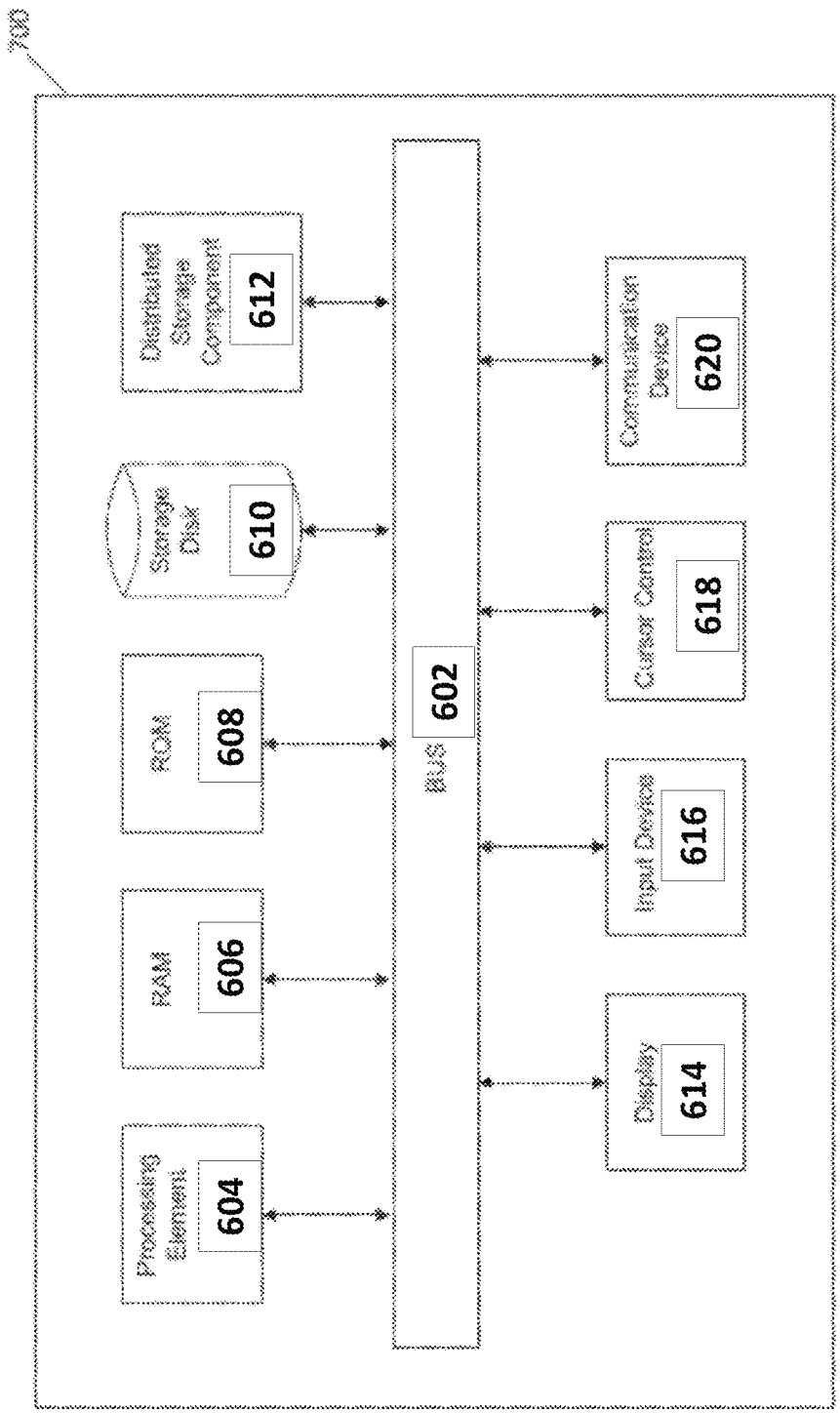
FIG. 6 depicts a block diagram of a computing device.

FIG. 6 depicts a block diagram of a computing device, according to various aspects. In the illustrated example, the computing device 600 may include a bus 602 or other communication mechanism of similar function for communicating information, and at least one processing element 604 (collectively referred to as processing element 604) coupled with bus 602 for processing information. As will be appreciated by those skilled in the art, the processing element 604 may include a plurality of processing elements or cores, which may be packaged as a single processor or in a distributed arrangement. Furthermore, a plurality of virtual processing elements 604 may be included in the computing device 600 to provide, e.g., the compression, encryption and comparison operations or the method 500 illustrated and discussed above.

The computing device 600 may also include one or more volatile memory (ies) 606, which can for example include random access memory (ies) (RAM) or other dynamic memory component(s), coupled to one or more busses 602 for use by the at least one processing element 604. Computing device 600 may further include static, non-volatile memory (ies) 608, such as read only memory (ROM) or other static memory components, coupled to busses 602 for storing information and instructions for use by the at least one processing element 604. A storage component 610, such as a storage disk or storage memory, may be provided for storing information and instructions for use by the at least one processing element 604. As will be appreciated, the computing device 600 may include a distributed storage component 612, such as a networked disk or other storage resource available to the computing device 600.

The computing device 600 may be coupled to one or more displays 614 for displaying information to a user. Optional user input device(s) 616, such as a keyboard and/or touchscreen, may be coupled to Bus 602 for communicating information and command selections to the at least one processing element 604. An optional cursor control or graphical input device 618, such as a mouse, a trackball or cursor direction keys for communicating graphical user interface information and command selections to the at least one processing element. The computing device 600 may further include an input/output (I/O) component, such as a serial connection, digital connection, network connection, or other input/output component for allowing intercommunication with other computing components and the various components of the systems 100, 300 and 400 or the method 500 illustrated and discussed above.

In various embodiments, the computing device 600 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the compression, encryption and comparison operations or the method 500 illustrated and discussed above may be supported by operation of the distributed computing systems.

The computing device 600 may be operative to control various operations of the method 500 illustrated above through a communication device such as, e.g., communication device 620, and to handle data such as, e.g., encrypted and compressed data. In some examples, analysis results are provided by the computing device 600 in response to the at least one processing element 604 executing instructions contained in memory 606 or 608 and performing operations on the received data items. Execution of instructions contained in memory 606 and/or 608 by the at least one processing element 604 can render the method 500 operative to perform methods described herein.

The term "computer-readable medium" as used herein refers to any media that participates in providing instructions to the processing element 604 for execution. Such a medium may take many forms, including but not limited to, non-volatile media, volatile media, and transmission media. Non-volatile media includes, for example, optical or magnetic disks, such as disk storage 610. Volatile media includes dynamic memory, such as memory 606. Transmission media includes coaxial cables, copper wire, and fiber optics, including the wires that include bus 602.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 604 for execution. For example, the instructions may initially be carried on the magnetic disk of a remote computer. The remote computer can load the instructions into its dynamic memory and send the instructions over a telephone line using a modem. A modem local to computing device 600 can receive the data on the telephone line and use an infra-red transmitter to convert the data to an infra-red signal. An infra-red detector coupled to bus 602 can receive the data carried in the infra-red signal and place the data on bus 602. Bus 602 carries the data to memory 606, from which the processing element 604 retrieves and executes the instructions. The instructions received by memory 606 and/or memory 608 may optionally be stored on storage device 610 either before or after execution by the processing element 604.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method for writable document forgery detection, the method comprising:
   extracting a reference writing sample from a media via a neural network by generating one or more first embedding vectors, and encoding the one or more first embedding vectors, wherein the one or more first embedding vectors include a biometric characteristic of the reference writing sample generated by the neural network, the biometric characteristic comprising a velocity of the reference writing sample;
   encrypting the one or more first embedding vectors;
   compressing the one or more first embedding vectors;
   printing the one or more first embedding vectors onto the writable document;
   receiving the writable document, the writable document including a handwritten segment;
   extracting one or more second embedding vectors from the handwritten segment of the received writable document;
   comparing the one or more first embedding vectors to the one or more second embedding vectors; and assessing a likelihood of the reference writing sample and the handwritten segment being written by a same person based on the comparison.

2. The method of claim 1, wherein encrypting the one or more first embedding vectors comprises encrypting one of an image of the reference writing sample and the biometric characteristic of the reference writing sample.

3. The method of claim 1, wherein encrypting the one or more first embedding vectors comprises encrypting one of an image of a signature and the biometric characteristic of the signature.

4. The method of claim 1, wherein printing the one or more first embedding vectors onto the writable document comprises printing on the writable document at least one of:
   a printed label;
   a printed bar code; and
   a printed quick response code.

5. The method of claim 1, wherein receiving the writable document comprises receiving the writable document at one of an automated teller machine and a receiving institution.

6. The method of claim 1, wherein receiving the writable document comprises scanning at least the handwritten segment of the received writable document.

7. The method of claim 1, wherein the writable document comprises one of a check and a legal instrument.

8. The method of claim 1, wherein extracting the one or more second embedding vectors from the handwritten segment included in the writable document comprises encrypting one of an image of the handwritten segment and the biometric characteristic of the handwritten segment.

9. The method of claim 1, wherein assessing the likelihood of the reference writing sample and the handwritten segment being written by the same person comprises generating a similarity factor between the reference writing sample and the handwritten segment.

10. The method of claim 9, further comprising:
    establishing a similarity factor threshold;
    wherein when the generated similarity factor is equal to or greater than the established similarity factor threshold, the reference writing sample and the handwritten segment are considered to be written by a same person.

11. A writable document forgery detection system comprising:
    an updatable data repository;
    a printing device; and
    a computing device operatively coupled to the updatable data repository, to the neural network and to the printing device, the computing device comprising a processor including a neural network and a memory, the memory storing instructions that, when executed by the processor, perform a set of operations comprising:
       extracting, via the neural network, a reference writing sample from a media by generating one or more first embedding vectors, and encoding the one or more first embedding vectors, wherein the one or more first embedding vectors include a biometric characteristic of the reference writing sample generated by the neural network, the biometric characteristic comprising a velocity of the reference writing sample;
       encrypting, via the processor, the one or more first embedding vectors;
       compressing, via the processor, the one or more first embedding vectors; and
       printing, via the printing device, the one or more first embedding vectors onto the writable document.

12. The system of claim 11, wherein the set of instructions comprises encrypting the one or more first embedding vectors by encrypting one of an image of the reference writing sample and the biometric characteristic of the reference writing sample.

13. The system of claim 11, wherein the set of instructions comprises encrypting the one or more first embedding vectors by encrypting one of an image of a signature and the biometric characteristic of the signature.

14. The system of claim 11, wherein the set of operations comprises printing the one or more first embedding vectors onto the writable document by printing at least one of a printed label, a printed bar code, and a printed quick response code.

15. A writable document forgery detection system comprising:
    a receiving device;
    an updatable data repository functionally coupled to the receiving device; and
    a computing device operatively coupled to the receiving device and to the updatable data repository, the computing device comprising a processor including a neural network and a memory, the memory storing instructions that, when executed by the processor, perform a set of operations comprising:
       receiving the writable document at the receiving device, the writable document including a handwritten segment and one or more first embedding vectors of a reference writing sample printed thereon, wherein the one or more first embedding vectors include a biometric characteristic of the reference writing sample generated by the neural network, the biometric characteristic comprising a velocity of the reference writing sample;
       extracting, via the processor, one or more second embedding vectors from the received handwritten segment of the writable document;
       comparing, via the processor, the one or more first embedding vectors to the-one or more second embedding vectors; and
       assessing, via the processor, a likelihood of the reference writing sample and the handwritten segment being written by a same person based on the comparison.

16. The system of claim 15, wherein the writable document comprises one of a check and a legal instrument.

17. The system of claim 15, wherein the receiving device comprises one of:
    an automated teller machine; and
    a reading machine at a receiving institution.

18. The system of claim 15, wherein the set of operations comprises receiving the writable document at the receiving device by scanning at least the handwritten segment of the received writable document at the receiving device.

19. The system of claim 15, wherein the set of operations comprises extracting the one or more second embedding vectors from the received handwritten segment of the writable document by extracting one of an image of the handwritten segment and the biometric characteristic of the handwritten segment.

20. The system of claim 15, wherein the set of operations comprises assessing the likelihood by generating a similarity factor between the reference writing sample and the handwritten segment.

21. The system of claim 20, wherein the set of operations further comprises:
    establishing a similarity factor threshold;
    wherein when the generated similarity factor is equal to or greater than the established similarity factor threshold, the reference writing sample and the handwritten segment are considered to be written by the same person.

22. A writable document forgery detection system comprising:

a receiving device;

a printing device;

at least one updatable data repository functionally coupled to the receiving device and to the embedding device;

at least one computing device operatively coupled to the receiving device and to the at least one updatable data repository, the at least one computing device comprising at least one processor including a neural network and at least one memory, the memory storing instructions that, when executed by the at least one processor, perform a set of operations comprising:

extracting, via the neural network, a reference writing sample from a media by generating one or more first embedding vectors, and encoding the one or more first embedding vectors, wherein the one or more first embedding vectors include a biometric characteristic of the reference writing sample generated by the neural network, the biometric characteristic comprising a velocity of the reference writing sample;

encrypting, via the at least one processor, the one or more first embedding vectors;

compressing, via the at least one processor, the one or more first embedding vectors;

printing, via the printing device, the one or more first embedding vectors onto the writable document;

receiving the writable document at the receiving device, the writable document including a handwritten segment;

extracting, via the at least one processor, one or more second embedding vectors from the handwritten segment of the writable document;

comparing, via the at least one processor, the one or more first embedding vectors to the one or more second embedding vectors; and assessing, via the at least one processor, a likelihood of the reference writing sample and the handwritten segment being written by a same person based on the comparison.

23. The system of claim 22, wherein at least one of the reference writing sample and the handwritten segment comprises a signature.

24. The system of claim 22, wherein the set of instructions comprise encrypting the one or more first embedding vectors by encrypting one of an image of a signature and the biometric characteristic of the signature.

25. The system of claim 22, wherein the set of instructions comprise encrypting the one or more first embedding vectors by encrypting one of an image of the reference writing sample and the biometric characteristic of the reference writing sample.

26. The system of claim 23, wherein the set of operations comprises extracting the one or more second embedding vectors from the handwritten segment of the writable document by encrypting one of an image of the handwritten segment and the biometric characteristic of the handwritten segment.

* * * * *